(12) United States Patent
Zadro

(10) Patent No.: US 6,305,809 B1
(45) Date of Patent: Oct. 23, 2001

(54) MIRROR WITH MULTIPLE SELECTABLE MAGNIFICATIONS

(76) Inventor: Zlatko Zadro, 16742 Wanderer La., Huntington Beach, CA (US) 92649

( * ) Notice: Subject to any disclaimer, the term of this patent is extended or adjusted under 35 U.S.C. 154(b) by 0 days.

(21) Appl. No.: 09/318,310

(22) Filed: May 25, 1999

(51) Int. Cl.[7] .............................. G02B 5/08; G02B 5/10; G02B 7/182
(52) U.S. Cl. ..................... 359/840; 359/850; 359/855; 359/865; 359/869; 359/872; 359/881; 248/474; 248/479; 248/486
(58) Field of Search ................................. 359/838, 840, 359/726, 802, 850, 855, 865, 869, 872, 879, 880, 881; 248/469, 474, 479, 484, 485, 486, 487

(56) References Cited

U.S. PATENT DOCUMENTS

| | | | |
|---|---|---|---|
| D. 431,375 | * | 10/2000 | Zadro . |
| 1,898,791 | * | 2/1933 | Schlumbohm . |
| 2,559,290 | * | 7/1951 | Engelmann ..................... 359/840 |
| 2,861,501 | * | 11/1958 | Strelakos . |
| 3,677,620 | * | 7/1972 | Bettencourt . |
| 3,824,001 | * | 7/1974 | Rosenberg ..................... 359/840 |
| 3,970,369 | * | 7/1976 | Wachsman . |
| 4,128,310 | * | 12/1978 | Miller . |
| 5,442,488 | * | 8/1995 | Pastorino . |

FOREIGN PATENT DOCUMENTS

252526 * 6/1926 (GB) .................................. 359/840

* cited by examiner

*Primary Examiner*—Ricky D. Shafer
(74) *Attorney, Agent, or Firm*—William L. Chapin

(57) ABSTRACT

A mirror for viewing the face at different magnifications selectable by the user includes a first, oval primary mirror comprised of a front mirror plate having a first magnification and a rear mirror plate concavely curved to provide a second, greater magnification, the front and rear primary mirror plates being held in a back-to-back arrangement within a bezel ring. The ring is pivotably supported within a yoke attached to the upper end of a stanchion which protrudes upwardly from a base, allowing the primary mirror to be pivoted about a horizontally disposed minor axis of the primary mirror, or about a vertical axis through the stanchion, thus presenting either the front or rear reflecting surface to a person located in front of the mirror. A circular secondary mirror having front and rear concave mirror plates providing third and fourth magnifications is pivotably mounted within an aperture centered on a major axis of the primary mirror, but offset from a minor axis which coincides with a horizontal pivot axis of the primary mirror, allowing the primary mirror to be pivoted to position the secondary mirror above or below the horizontally disposed pivot axis/minor axis of the primary mirror, to view upper or lower portions of the face in the secondary mirror. Also, the secondary mirror may be pivoted to present either its first or second reflecting surface at either upper or lower position of the primary mirror. In an alternate embodiment, a secondary mirror is slidably held within a bezel ring from a concealed position between front and rear primary mirror plates to a radially outwardly protruding use position, or rotatably mounted to the bezel ring.

26 Claims, 10 Drawing Sheets

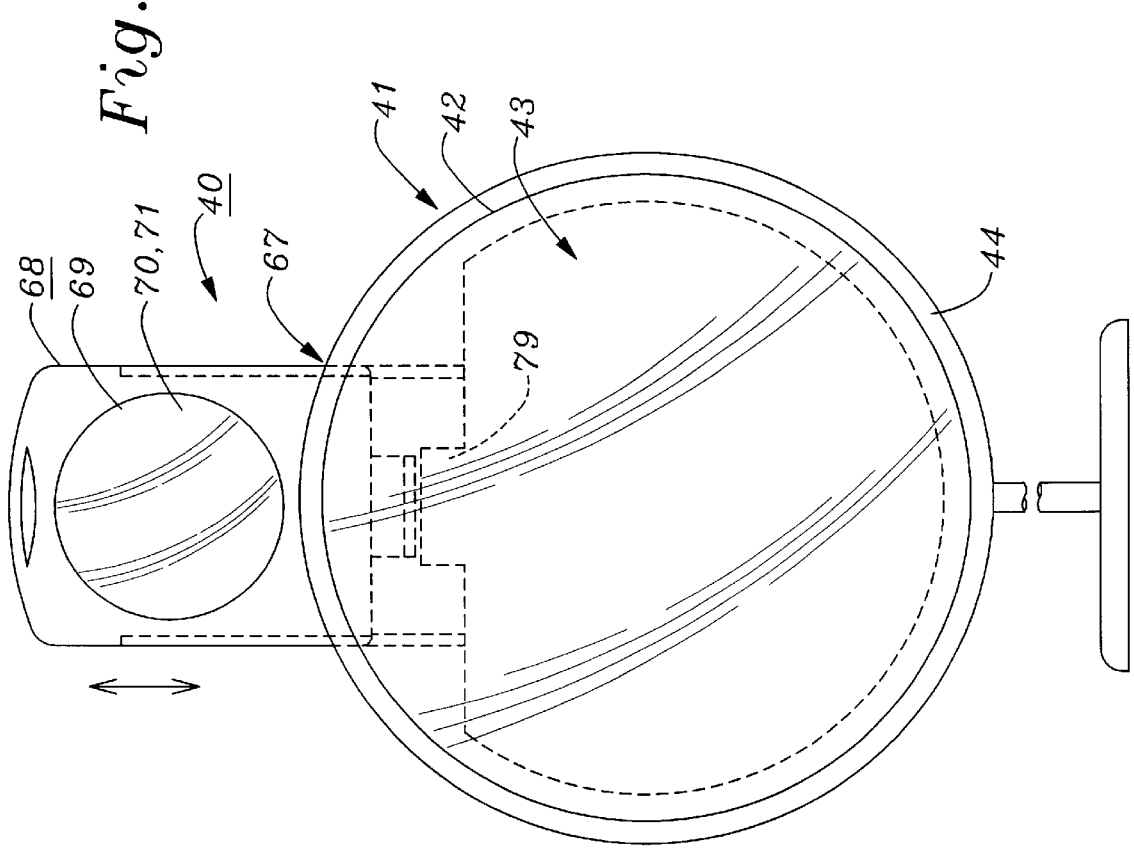
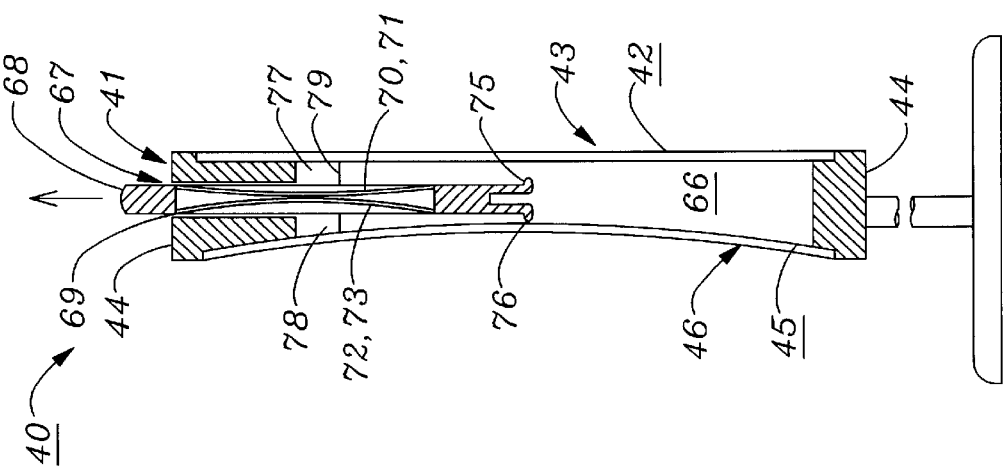

MIRROR WITH MULTIPLE SELECTABLE MAGNIFICATIONS

BACKGROUND OF THE INVENTION

A. Field of the Invention

The present invention relates to mirrors of the type used for personal hygiene purposes such as applying cosmetics to the face, shaving and similar tasks. More particularly, the invention relates to a mirror having multiple discrete reflecting surfaces, each having a different magnification.

B. Description of Background Art

There are a variety of occasions on which a person may wish to have available a mirror with selectable magnifications. For example, a person who is somewhat near-sighted may wish to use a magnifying mirror to install or remove contact lenses, since ordinary flat bathroom mirrors or portable mirrors having a one-to-one, or unity magnification may be inadequate for the task. However, since the field of view of a magnifying mirror is less than that of a unity magnification mirror of the same size, the latter is preferred for certain uses. Thus, a magnifying mirror may be desirable for certain application while at other times a person may wish to have a full face view provided by a mirror having a smaller magnification. Also, a magnifying mirror having different magnifications is useful for people whose vision changes as they age. Applying cosmetics, shaving and performing other such tasks may also be facilitated by the use of a mirror having different, selectable magnifications.

One approach to satisfying the need for a personal hygiene or cosmetic mirror having different magnifications consists of a two-sided mirror, which has on one side thereof a flat mirror plate which affords a unity magnification, and on the other side thereof a concave mirror plate having a magnification greater than one, the two mirror plates being arranged in a back-to-back configuration. A variety of such two-sided mirrors exist, which are intended for use while combing one's hair, applying facial makeup, or attending to other tasks related to personal hygiene or appearance. Existing mirrors of the aforementioned type have on one side thereof a flat mirror surface which provides a unity magnification, and on the other side a concave mirror surface having a magnification greater than 1, e.g., 2×, 3×, 4×, or 5×.

Another type of mirror known to the present inventor which has two discrete magnifications consists of a relatively large oval mirror having a first magnification, unity, for example, and a circular mirror of smaller diameter affixed to or inset into the front surface of the larger oval mirror, the smaller mirror having a concave reflective surface which provides a magnification greater than one.

In U.S. patent application Ser. No. 08/708,290 filed Sep. 07 1996, now U.S. Pat. No. 5,900,996, issued May 4, 1999, the present inventor disclosed a sing sided mirror having a magnification which may be varied from unity to a substantially larger value, 5×, for example, by axially deforming a flexible mirror plate or diaphragm having a front reflective mirror surface, the deformation decreasing the focal length of the mirror. The disclosure of that application is hereby incorporated by reference into the specification of the present application. The present invention was conceived of to provide a mirror of simplified design and construction for personal use which has more than two discrete, selectable magnifications.

OBJECTS OF THE INVENTION

An object of the present invention is to provide a mirror having multiple selectable magnifications.

Another object of the invention is to provide a mirror including a first, larger primary mirror having a first reflective surface which provides a first magnification, in which primary mirror is pivotably mounted a two-sided, secondary mirror having on opposite sides thereof reflective mirror surfaces having second and third magnifications, respectively, different from one another and from that of the first reflective surface of the primary mirror.

Another object of the invention is to provide a mirror including a first, larger primary mirror having a first, front surface which provides a first magnification, in which primary mirror is pivotably mounted a two-sided, secondary mirror having on opposite sides thereof reflective mirror surfaces having second and third magnifications different from that of the first surface of the primary mirror, the primary mirror also having a second, rear surface which provides a fourth magnification different from the first three magnifications.

Another object of the invention is to provide a mirror including a first, larger primary mirror having an oval shape and pivotably mounted in frame on a pivot axis aligned with a minor axis of the primary mirror, the primary mirror having on a first surface thereof a reflective surface having a first magnification and having through its thickness dimension an aperture offset from the minor axis of the primary mirror, in which aperture is pivotably mounted a secondary mirror having on one surface thereof a reflective surface having a second magnification and on the opposite side a reflective surface having a third magnification, the primary mirror having a second, opposite surface having a fourth magnification.

Another object of the invention is to provide a mirror including a front primary mirror plate having a reflective surface which provides a first magnification, the front primary mirror plate being held within a primary mirror frame in a longitudinally spaced apart relationship to a rear backing plate, and a secondary mirror having a different magnification slidably held within the primary mirror frame from a concealed position between the front and rear primary mirror plate to a radially outwardly extended use position.

Another object of the invention is to provide a mirror including front and rear primary mirror plates held in a longitudinally spaced apart arrangement within a bezel ring which rotatably holds a smaller secondary mirror which protrudes radially outwardly from the bezel ring, and which may be rotated to display either a front or rear magnifying mirror surface.

Another object of the invention is to provide a mirror including a front primary mirror plate held in a bezel to which is attached a dual-sided magnifying mirror which may be pivoted from a position in front of the front primary mirror plate to a position radially outwardly offset therefrom.

Another object of the invention is to provide a mirror including a front primary mirror plate held in a bezel to which is attached a magnifying lens which may be pivoted from a use position in front of the front primary mirror plate to a position radially outwardly offset therefrom.

Another object of the invention is to provide a mirror including a bezel ring having formed in a peripheral wall thereof a slot which spans the upper half of the bezel ring for interchangeably receiving removable mirror plates of user selected magnifications.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a mirror intended primarily for use by a person to view his or her face, the mirror having a plurality of reflective surfaces, each having a different magnification.

A mirror with multiple selectable magnifications according to the present invention includes a first, larger primary mirror which may have a circular plate-like shape but preferably has an oval shape. The primary mirror comprises a first mirror plate on a first, front side of the primary mirror, having a mirrored reflecting surface which has a first magnification, and a second mirrored plate on the second, rear side of the primary plate, having a reflecting surface which has a second magnification. The primary mirror is pivotably mounted in a frame pivotably supported by a base, in a manner permitting the primary mirror to be pivoted about a horizontally disposed minor axis or diameter of the primary mirror or about a vertical axis through the base, thus presenting either the first or second reflecting surface to a person located in front of the mirror.

According to the invention, the primary mirror structure has through its thickness dimension an aperture in which is pivotably mounted a smaller, secondary mirror of the same general shape as the aperture. In a preferred embodiment, the aperture and primary mirror have a circular shape, and a common center located on the major axis or a diameter of the primary mirror, and offset radially outwardly from the minor axis or a perpendicular diameter of the primary mirror.

Also in accordance with the present invention, the secondary mirror has a platelike, preferably circular shape, and has a fist mirrored reflecting surface having a first magnification on a first, front side of the secondary mirror, and a second mirrored reflecting surface having a second magnification on the second, rear side of the secondary mirror. With this arrangement, the primary mirror may be pivoted to position the secondary mirror above or below the horizontally disposed pivot axis and minor axis of the primary mirror, to view upper or lower portions of the face in the secondary mirror. Moreover, the secondary mirror may be pivoted to present either its first or second reflecting mirrored surface at an upper or lower position of the secondary mirror. In a preferred embodiment, the two magnifications of the primary mirror and the two magnifications of the secondary mirror are all different from one another, thus providing a mirror which has four discrete user selectable magnifications.

BRIEF DESCRIPTION OF THE DRAWINGS

FIG. 5 is a front elevation view of a first modification of a mirror with multiple selectable magnifications according to the present invention, showing a secondary mirror thereof in a deployed position.

FIG. 6 a transverse sectional view of the mirror of FIG. 5, showing a secondary mirror therof in a stored position.

DESCRIPTION OF THE PREFERRED EMBODIMENTS

FIGS. 1–14 illustrate mirrors having multiple selectable magnifications according to the present invention.

Figure 1:
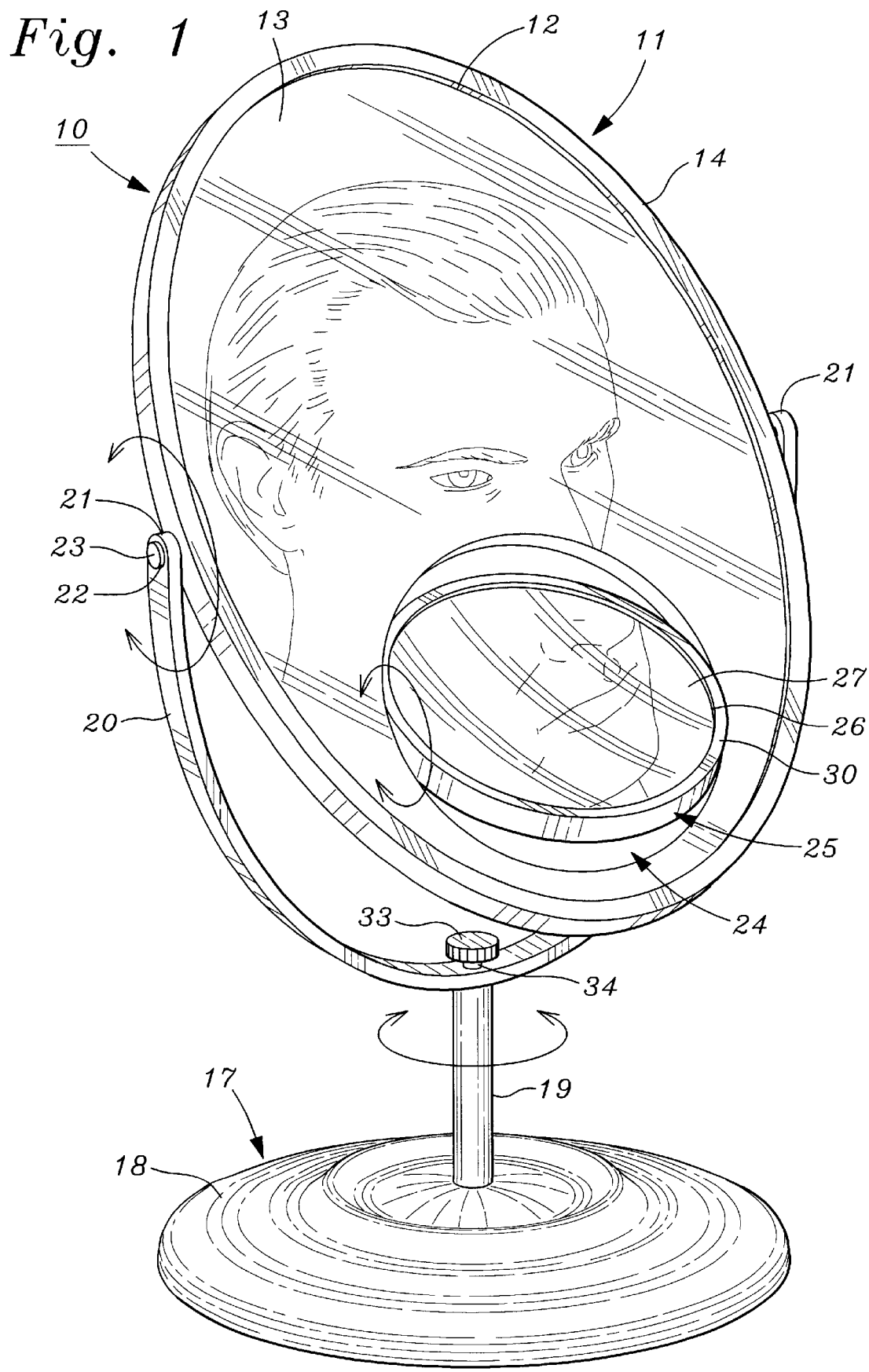
FIG. 1 is a front perspective view of a magnifying mirror having four discrete magnifications according to the present invention.

Referring first to FIG. 1, a mirror 10 having multiple selectable magnifications according to the present invention may be seen to include a first, oval-shaped primary mirror structure 11. Primary mirror structure 11 includes a first, front oval-shaped reflecting mirror plate 12 which has a mirrored surface 13 that provides a first magnification A. Front mirror plate 10 is preferably a glass mirror but may optionally be a second surface acrylic mirror having an inner metallized reflecting surface, and is held within an oval bezel ring 14.

Figure 3:
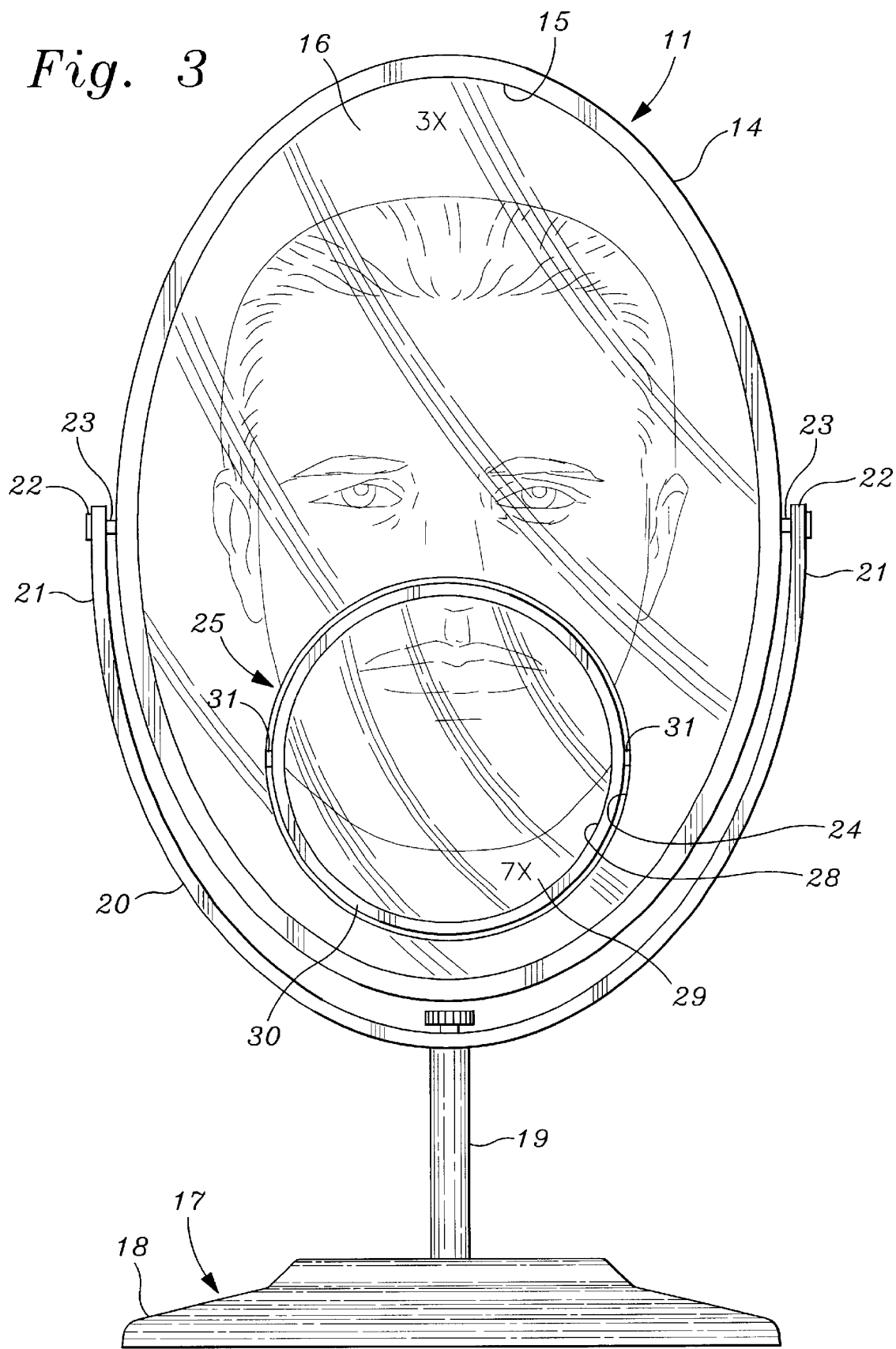
FIG. 3 is a rear elevation view of the mirror of the present invention, configured as shown in FIG. 2.

As may be seen best by referring to FIG. 3, primary mirror structure 10 includes a second, rear oval-shaped reflecting mirror plate 15 having a mirrored surface 16 which provides a second magnification B. Preferably, rear mirror surface 15 has a greater concavity than front mirror surface 13, thus making magnification B greater than A. Rear mirror plate 15 is also preferably a glass mirror, and is held in a back-to-back parallel arrangement with respect to front mirror plate 12 within an oval bezel ring 14.

As shown in FIGS. 1 and 3, mirror 10 includes a stand 17 having a base 18 for supporting the mirror on an object such as a table, a stanchion 19 which protrudes perpendicularly upwards from the center of the base, and a yoke or C-shaped gimbal ring segment 20. The latter has horizontally aligned, laterally opposed upper ends 21 having apertures 22 therethrough which rotatably hold a pair of laterally opposed, horizontally disposed pivot pins 23 which protrude laterally outward from laterally opposed sides of bezel ring 14.

As shown in FIG. 1, pivot pins 23 are coaxial with a horizontally disposed minor axis of oval primary mirror structure 11. Thus, as may be understood by referring to FIG. 4 in conjunction with FIG. 1, primary mirror structure 11 may be pivoted along the minor axis of the mirror structure to any desired vertical angle.

Referring now to FIG. 1, it may be seen that mirror 10 has through its thickness dimension, i.e., through both front and rear primary mirror plates 12 and 15, a circular aperture 24. Aperture 24 is preferably centered on a major axis of primary mirror structure 11 which lies in a vertical plane, and is preferably located below the minor axis of the primary mirror structure.

Figure 2:
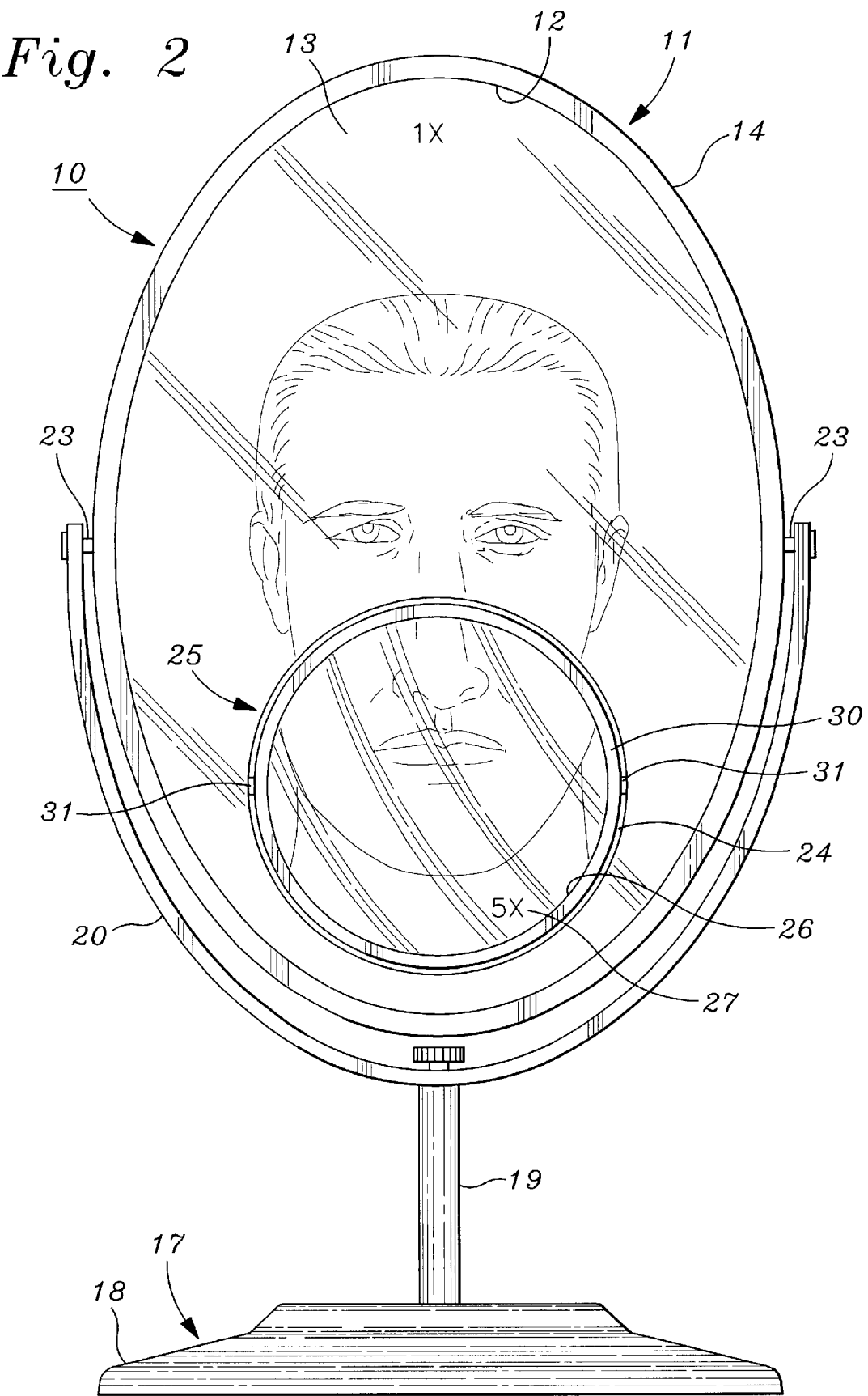
FIG. 2 is a front elevation view of the mirror of FIG. 1, showing a circular inset mirror portion thereof rotated to display a reflecting surface having a different magnification than that shown in FIG. 1.

As may be seen best by referring to FIGS. 1 and 2, mirror 10 includes a circular secondary mirror 25 which is of smaller diameter than aperture 24 and fits coaxially within the aperture. As shown in FIGS. 1 and 2, secondary mirror 25 includes a first, front circular mirror plate 26 which has a mirrored reflective surface 27 that provides a reflected image having a magnification C. Front circular mirror plate 26 is preferably a glass mirror.

As shown in FIG. 3, circular secondary mirror structure 25 includes a second, rear circular mirror plate 28 which has a mirrored reflective surface 29 that provides a reflected image having a magnification D. Rear circular mirror plate 28 is also preferably a glass mirror.

Figure 4:
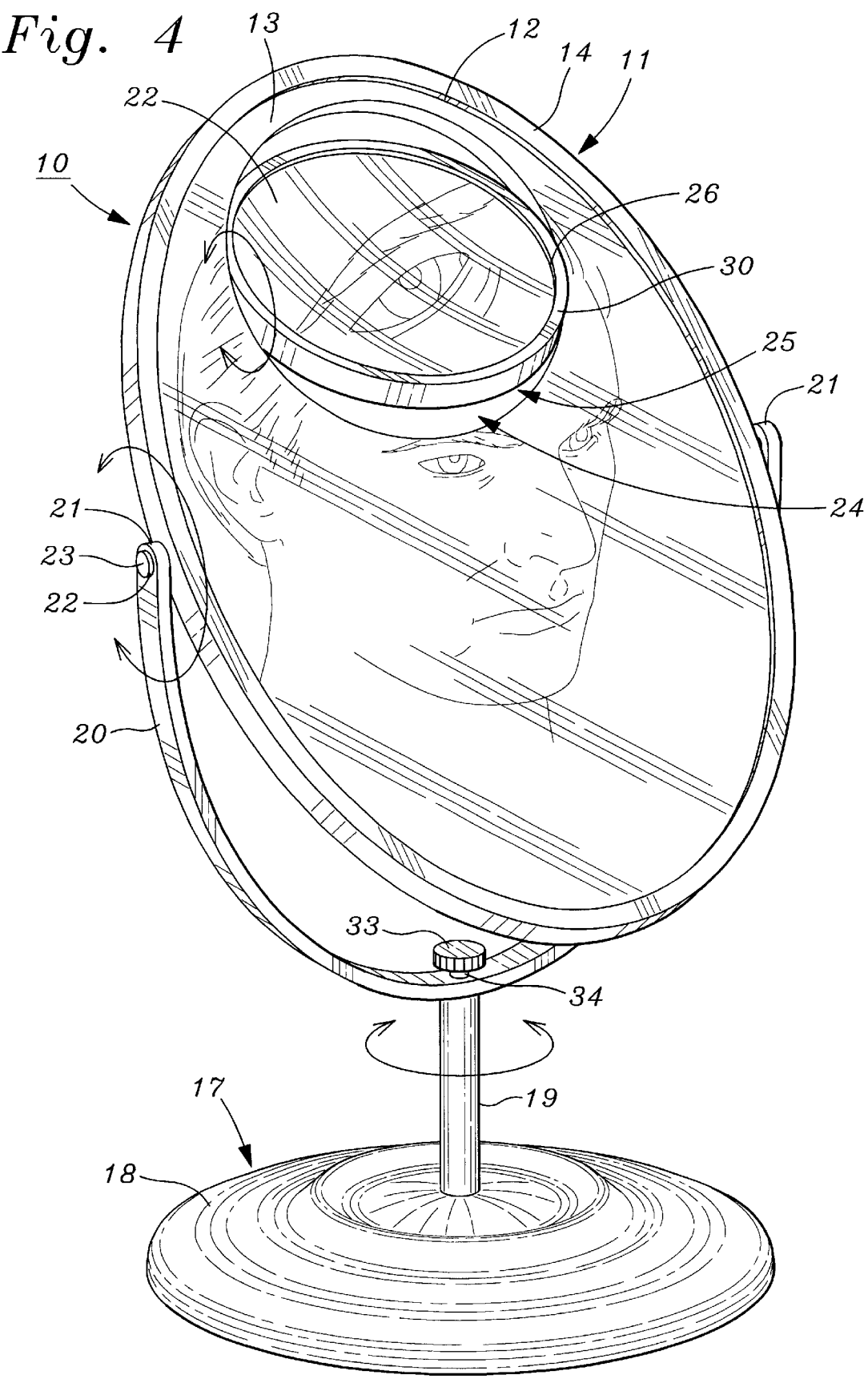
FIG. 4 is a front elevation view of the mirror of FIG. 1, showing the outer frame thereof rotated to position a circular insert mirror portion thereof above a horizontal center line or pivot axis of the primary mirror.

Referring still to FIGS. 1 and 2, it may be seen that front and rear circular mirror plates 26 and 28 are held in a back-to-back, parallel arrangement within a circular bezel ring 30. Bezel ring 30 is provided with a pair of laterally opposed, laterally outwardly protruding pivot pins 31 which are rotatably held within a pair of sockets 32 located between front and rear primary mirror plates 12 and 15. Thus, as shown in FIGS. 1, 2, and 4, circular secondary mirror structure 25 may be pivoted along the axes of pivot pins 31 to any desired angular orientation with respect to primary mirror structure 11.

Modes of using mirror 10 to select various magnifications thereof may be best understood by referring to FIGS. 1–4. As shown in FIG. 2, an image of a person's face is shown reflected from surface 13 of first, front mirror plate 12 of oval primary mirror 11. In an example embodiment, the magnification A of front primary mirror plate 12 would be unity, or 1×, thus providing a relatively wide angle view which may include the entire face.

Referring still to FIG. 2, it may be seen that an image of a lower portion of a person's face is reflected from a first, front reflecting surface 27 of front mirror plate 26 of circular secondary mirror 25. In an example embodiment, the magnification C of front secondary mirror plate would be larger than one, 5×, for example, affording a more detailed view of the lower portion of a person's face.

Referring now to FIG. 1, it may be seen that support yoke 20 for mirror 10 is preferably fastened to the upper end of stand stanchion 19 by means of a vertically disposed thumb screw 33 which fits downwardly through a clearance bore 34 provided through the yoke, and which is threadingly received in a threaded blind bore which extends downwardly into the stanchion. Thus constructed, yoke 20 and mirror 10 may be rotated about a vertically disposed pivot axis coaxial with the longitudinal axis of thumb screw 33, to present the rear side of the mirror, as shown in FIG. 3.

Referring now to FIG. 3, an image of a person's face is shown reflected from surface 16 of second, rear primary mirror plate 15. In an example embodiment, rear primary mirror plate 15 would be slightly concave, rather than flat, like front primary mirror plate 12, thus affording a magnification B greater than 1, e.g., 3×. Thus, as shown in FIG. 3, the image of a person's face would appear larger than that shown in FIG. 2.

Referring still to FIG. 3, it may be seen that image of a lower portion of a person's face is reflected from a second, rear reflecting surface 29 of rear mirror plate 20 of secondary mirror 25. In an example embodiment, the magnification D of rear secondary mirror plate 28 would be larger than the magnifications of both rear primary plate 15 and front secondary mirror plate 20, e.g., 7×, thus affording a view of the lower portion of a person's; face even more detailed than that provided by the front secondary mirror plate, as shown in FIG. 2. Moreover, since secondary mirror 25 is pivotably mounted to primary mirror 11, as described above, the secondary mirror may be rotated 180 degrees to present either magnification-factor secondary mirror surface in combination with either magnification-factor primary mirror surface.

FIG. 4 illustrates another mode of using mirror 10. As shown in FIG. 4, bezel 14 of primary mirror 11 may be rotated about pivoted pins 23 with respect to support yoke 20 to position secondary mirror 25 above the minor axis of the primary mirror. In this position, either side of secondary mirror 25 may be rotated into place to provide a magnified view of an upper portion of a person's face.

In the embodiment of the invention described above, the primary mirror has a vertically elongated oval shape, and the secondary mirror has a circular shape. Other mirror shapes would of course also be within the spirit of the invention, such as a circular primary mirror contained within a circular or oval secondary mirror. Also, the secondary mirror and/or the primary mirror could be mounted on pivot pins whose axes lie in a vertical plane, rather than a horizontal plane.

Figure 4A:
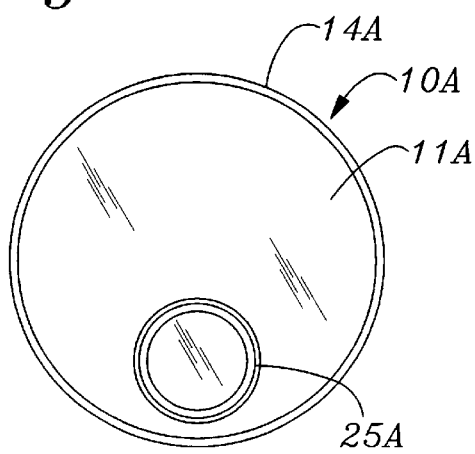
FIG. 4A is a fragmentary front elevation view of a first variant of the mirror of FIGS. 1–4.
Figure 4B:
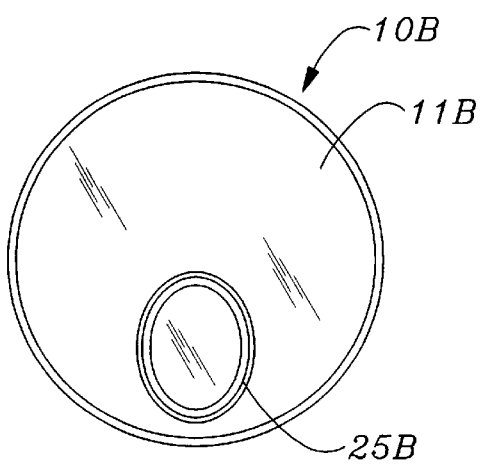
FIG. 4B is a fragmentary front elevation view of a second variant of the mirror of FIGS. 1–4.
Figure 4C:
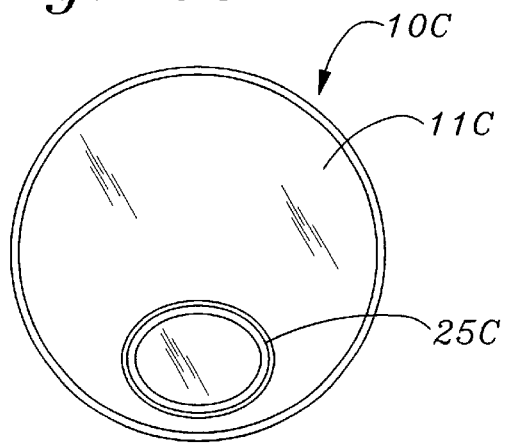
FIG. 4C is a fragmentary front elevation view of a third variant of the mirror of FIGS. 1–4.
Figure 4D:
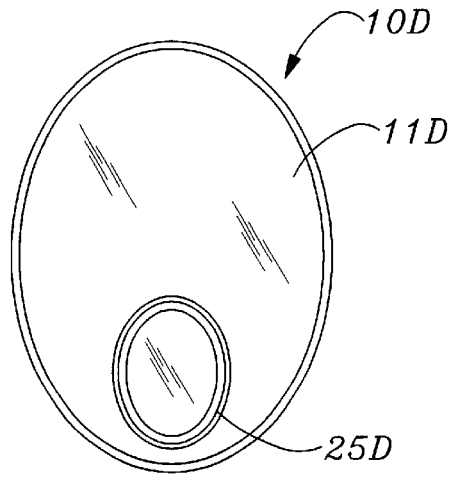
FIG. 4D is a framentary front elevation view of a fourth variant of the mirror of FIGS. 1–4.
Figure 4E:
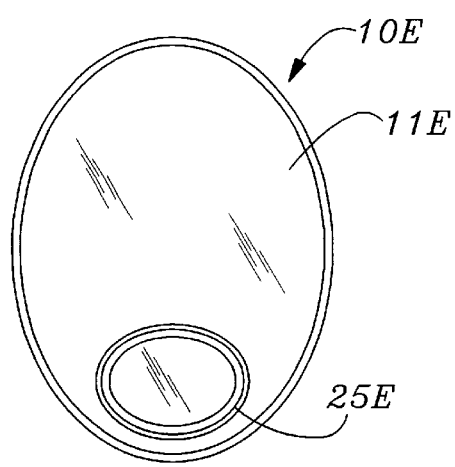
FIG. 4E is a fragmentary front elevation view of a fifth variant of the mirror of FIGS. 1–4.

Thus, FIG. 4A illustrates a first variant 10A of mirror 10 shown in FIGS. 1–4, which variant includes a circular primary mirror 11A held in a circular bezel ring 14A and pivotably holding a circular secondary mirror 25A. FIG. 4B illustrates a second variant mirror 10B which has a circular primary mirror 11B and a vertically elongated oval secondary mirror 25B. FIG. 4C illustrates a third variant mirror 10C which has a circular primary mirror 11C and a horizontally elongated oval secondary mirror 25C. FIG. 4D illustrates a fourth variant mirror 10D which has an oval primary mirror 11D and a vertically elongated oval secondary mirror 25D. FIG. 4E illustrates a fifth variant mirror 10E which has an oval primary mirror 11E and a horizontally elongated oval secondary mirror 25E.

FIGS. 5 and 6 illustrate a first modification of mirror 10 depicted in FIGS. 1–4 and described above.

Referring now to FIGS. 5 and 6, it may be seen that first modified mirror 40 includes a primary mirror 41 similar in construction and function to primary mirror 11 of basic embodiment 10 described above. Thus, primary mirror 41 of first modified mirror 40 includes a first, front circular mirror plate 42 which has a mirrored surface 43 that provides a first magnification, e.g., unity. Primary mirror 41 also has a second, rear circular mirror plate 45 having a concave mirrored surface 46 which provides a second magnification greater than that of front primary mirror plate 42. Front and rear primary mirror plates 42 and 45 are held in a coaxial, longitudinally spaced apart relationship within a circular bezel ring 44, forming within mirror 40 a hollow interior space 66.

As shown in FIGS. 5 and 6, the upper semicircular portion of bezel ring 44 has through its thickness dimension a radially disposed, rectangular perforation 67 which radially slidably receives a rectangular frame 68 which holds a secondary mirror 69. Secondary mirror 69 includes a front circular, concave mirror plate 70 which has a mirrored surface 71 that provides a third magnification. Secondary mirror 69 also includes a second, rear circular mirror plate 72 having a concave reflecting surface 73 that provides a fourth magnification.

As shown in FIG. 6, a lower or inner horizontal edge wall 74 of secondary mirror frame 68 has protruding forward and rearward from front and rear edges thereof front and rear flexible ears 75 and 76, respectively. The latter are lockingly engageable within front and rear recesses 77 and 78, respectively, provided in a block 79 which is fastened to the inside of bezel ring 44. Thus, when secondary mirror frame 68 is grasped and pulled radially outwardly from a stowed position, as shown in FIG. 6, to a deployed position, as shown in FIG. 5, front and rear ears 75 and 76 snap resiliently into front and rear recesses 77 and 78, respectively, holding secondary mirror 69 in an upright use position. When it is desired to stow secondary mirror 69, it is pushed radially downwards with sufficient force for lower curved cam surfaces of ears 75 and 76 to be pressed elastically inwardly towards one another by contact with lower edge walls of recesses 77 and 78, thus disengaging the ears from the recesses and permitting relative radial inward displacement therebetween.

Figure 7:
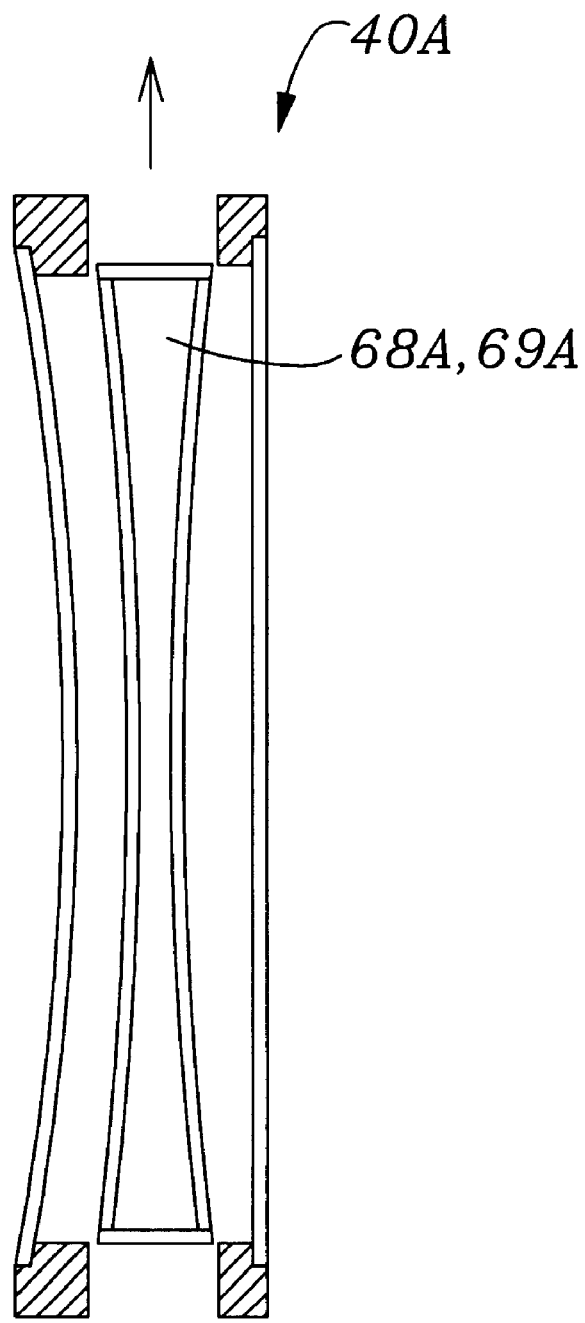
FIG. 7 is a transverse sectional view of a modification of the mirror of FIGS. 5 and 6, which employs a larger secondary mirror.
Figure 8:
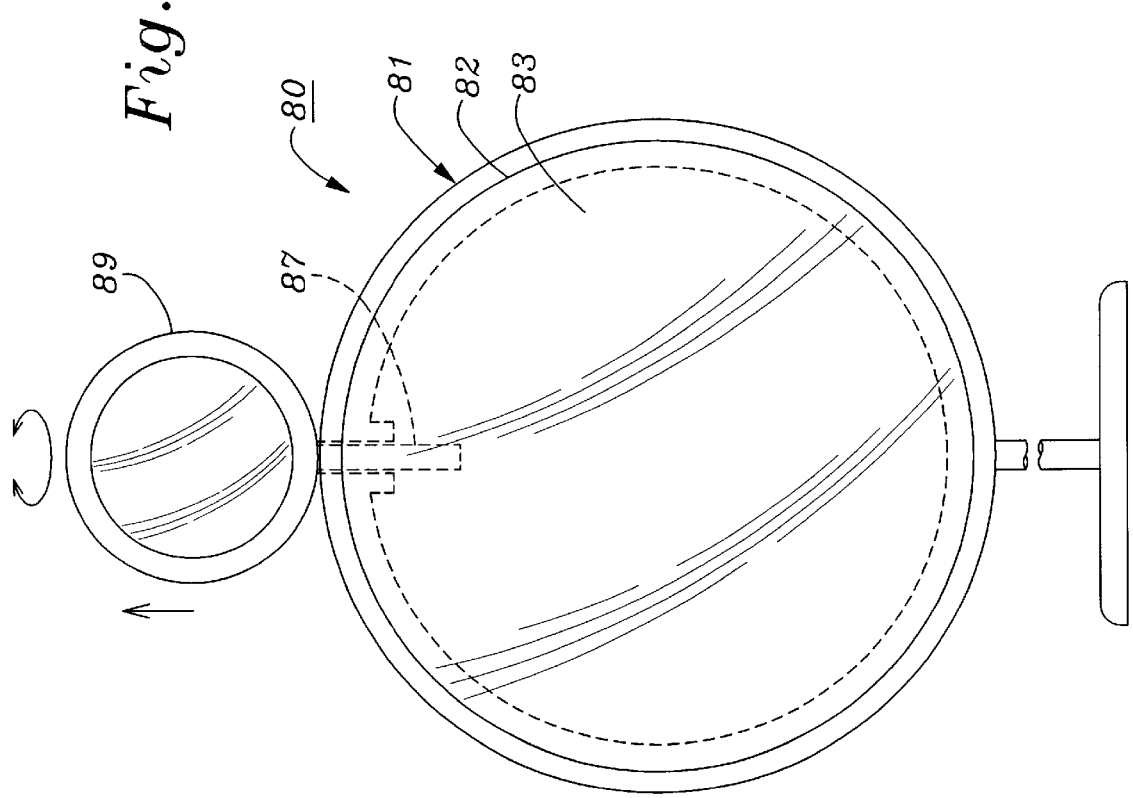
FIG. 8 is a front elevation view of a second modification of a mirror with mulitiple selectable magnifications according to the present invention.
Figure 9:
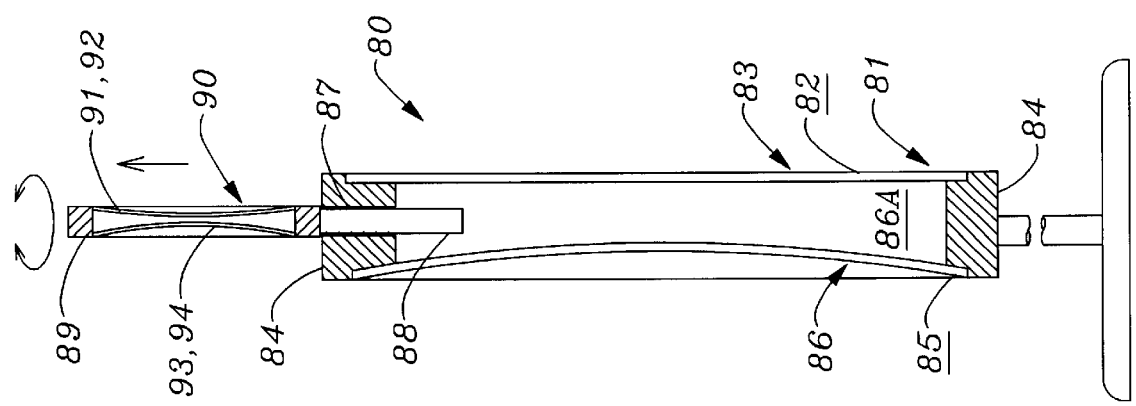
FIG. 9 is a transverse sectional view of the mirror of FIG. 8.

FIG. 7 is a transverse sectional view of an alteration 40A of first modified mirror 40 depicted in FIGS. 5 and 6 and described above. Modified mirror 40A is substantially similar in structure and function to modified mirror 40, but includes a larger secondary mirror frame 68A and secondary mirror 69A. FIGS. 8 and 9 illustrate a second modification 80 of mirror 10 depicted in FIGS. 1–4 and described above.

Referring now to FIGS. 8 and 9, it may be seen that second modified mirror 80 includes a primary mirror 81 similar in construction and function to primary mirror 11 of basic embodiment 10 described above. Thus, primary mirror 81 of second modified mirror 80 includes a first, front circular mirror plate 82 that has a mirrored surface 83 which provides a first magnification. Primary mirror 81 also has a second, rear circular mirror plate 85 having a concave mirrored surface 86 which provides a second magnification greater than that of front primary mirror plate 82. Front and rear primary mirror plates 82 and 85 are held in a coaxial, longitudinally spaced apart relationship within a circular bezel ring 84, forming within mirror 80 a hollow interior space 86A.

As shown in FIGS. 8 and 9, the upper semi-circular portion of bezel ring 64 has through the apex thereof a circular cross section, radially disposed bore 87 which penetrates the outer and inner circumferential walls of the bezel ring. Bore 87 serves as a bearing jornual which rotatably receives a cylindrically-shaped support pin or stanchion 88 which protrudes radially downwardly from a secondary mirror frame 89 which holds a secondary mirror 90. Secondary mirror frame 89 holds a secondary mirror 90 which includes a first, font circular mirror plate 91 which has a concave mirrored surface 92 that provides a third magnification. Secondary mirror 90 also includes a second, rear circular mirror plate 93 which has a concave mirrored reflecting surface 94 that provides a fourth magnification. As shown in FIGS. 8 and 9, stanchion 88 of secondary mirror frame 89 may be rotated within bore 87 of mirror 80 to present either third or fourth magnification mirror surfaces to a person viewing the mirror.

Figure 11:
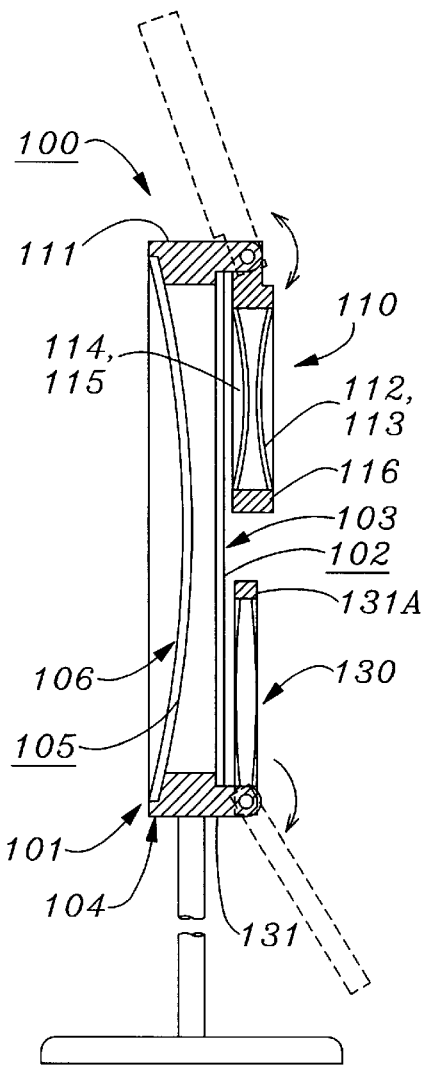
FIG. 11 is a transverse sectional view of the mirror of FIG. 10.
Figure 10:
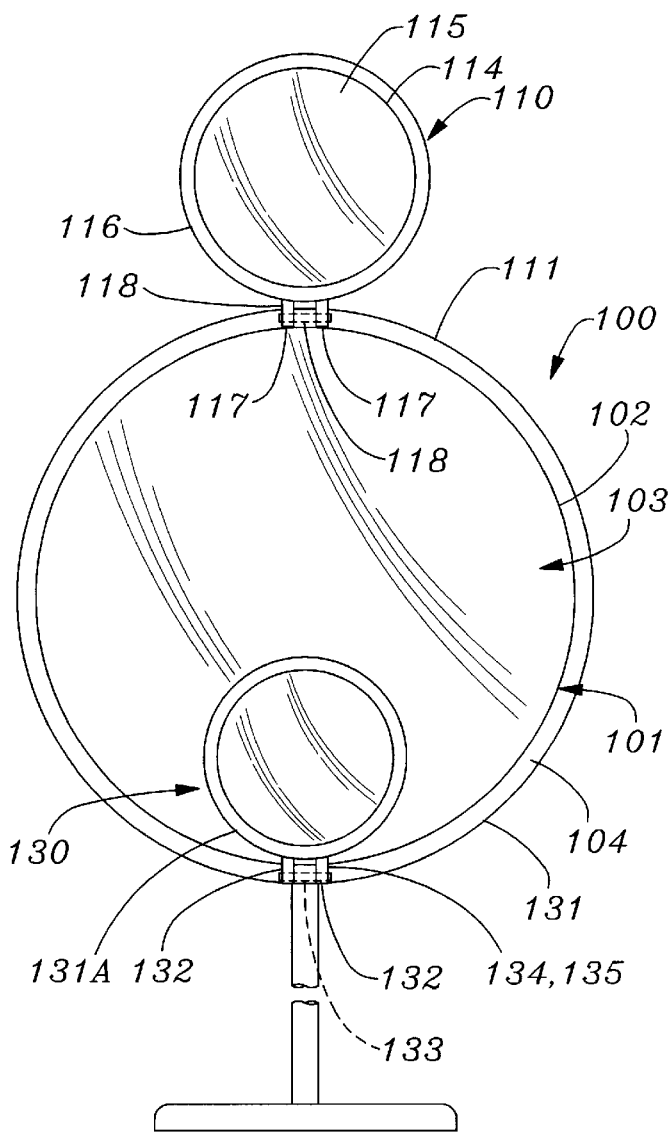
FIG. 10 is a front elevation view of a third modification of a mirror with multiple selectable magnifications according to the present invention.
Figure 12:
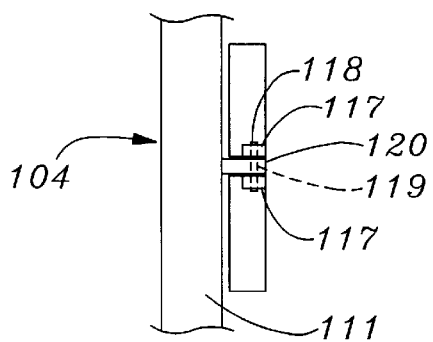
FIG. 12 is a fragmentary upper plan view of the mirror of FIGS. 10 and 11.

FIGS. 10–12 illustrate a third modification of mirror 10 depicted in FIGS. 1–4 and described above.

Referring now to FIGS. 10 and 11, it may be seen that a third modified mirror 100 includes a primary mirror 101 similar in construction and function to primary mirror 11 of basic embodiment 10 described above. Thus, primary mirror 101 of third modified mirror 100 includes a first, front circular mirror plate 102 that has a mirrored surface 103 which provides a first magnification. Primary mirror 101 also has a second, rear circular mirror plate 105 having a concave mirrored surface 106 which provides a second magnification greater than that of front primary mirror plate 102. Front and rear primary mirror plates 102 and 105 are held in a coaxially aligned, longitudinally spaced apart relationship within a circular bezel ring 104.

As shown in FIGS. 10 and 11, third modified mirror 100 includes a circular secondary mirror 110 of smaller diameter than primary mirror 101, which is pivotably mounted to an upper edge wall 111 of bezel ring 104. Secondary mirror 110 includes a first, front circular mirror plate 112 which has a concave mirrored surface 113 that provides al third magnification. Secondary mirror 110 also includes a second, rear circular mirror plate 114 which has a concave mirrored reflecting surface 115 that provides a fourth magnification.

As shown in FIGS. 10 and 12, secondary mirror 110 has a frame 116 which is pivotably mounted to upper edge wall 111 of bezel ring 104. Thus, as shown in FIGS. 10 and 12, frame 116 includes a pair of downwardly depending, laterally spaced apart ears 117 that hold a laterally disposed pin 118 which is pivotably held within a bore 119 disposed transversely through a cylindrical boss 120 which protrudes forwardly from upper edge wall 111 of bezel ring 104. Thus constructed, secondary mirror 110 may be pivoted from a first, lower position, as shown in FIG. 11, in which a second, rear mirror plate 114 of the secondary mirror is adjacent to front mirror plate 102 of primary mirror 101, to a second upright position, as shown in FIG. 10, in which first, front mirror plate 113 of the secondary mirror is above the primary mirror.

Referring again to FIGS. 10 and 11, it may be seen that third modified mirror 100 may include a magnifying lens 130 of smaller diameter than primary mirror 101, which is pivotably mounted to a lower edge wall 131 of bezel ring 104. Magnifying lens 130 may be pivotably mounted to bezel ring 104 in a manner similar to the way in which secondary mirror 110 is mounted to the bezel ring. Thus, magnifying lens 130 includes a frame 131 that has a pair of upwardly protruding, laterally spaced apart ears 132 through which penetrates a laterally disposed pin 133 that is pivotably held within a bore 134 disposed through a cylindrical boss 135 which protrudes forwardly from lower edge wall 131 of bezel ring 104. With this construction, magnifying lens 130 may be pivoted from a first, lower inactive position, as shown in phantom in FIG. 11, to a second, upright position parallel to and in front of front reflecting surface 103 of primary mirror 101, in which position reflected images viewed through the lens are magnified.

Figure 14:
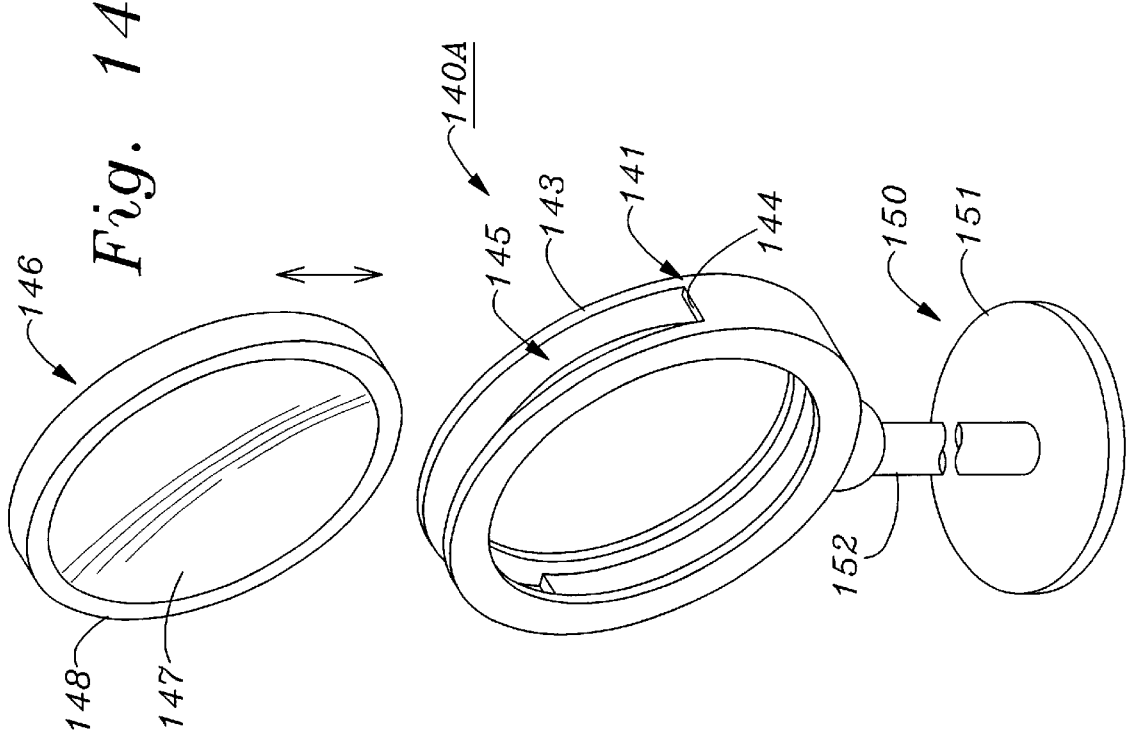
FIG. 14 is a view similar to that of FIG. 13, showing a further modification of the mirror shown therein.
Figure 13:
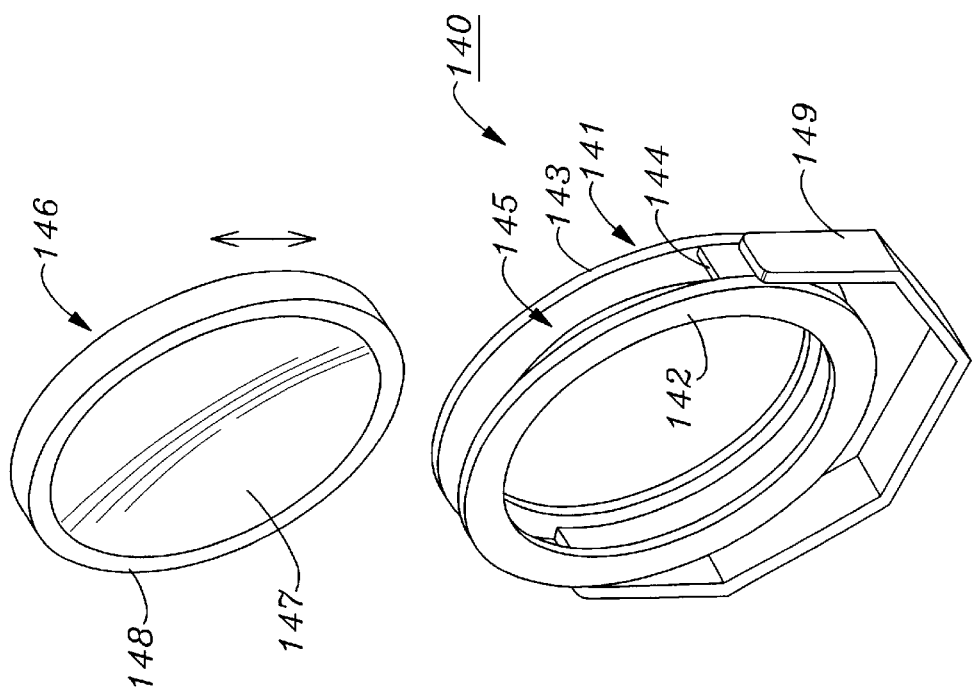
FIG. 13 is an exploded perspective view of a fourth modification of a mirror with multiple selectable magnifications according to the present invention.

FIGS. 13 and 14 illustrate a fourth modification of a mirror with multiple user-selectable magnifications according to the present invention.

As shown in FIGS. 13 and 14, a fourth modified mirror 140 according to the present invention includes a circular frame ring 141 having parallel annular ring-shaped front and rear walls 142 and 143 joined by an annular ring-shaped web 144. As shown in the figures, web 144 of frame ring 141 has formed in an upper semicircular portion of the peripheral wall thereof a semicircularly-shaped slot 145 or perforation between front and rear walls 142 and 143 of the frame ring. Slot 145 is adapted to insertably receive a mirror 146 consisting of a mirror plate 147 held in a bezel ring 148 of slightly smaller diameter than the slot.

Frame ring 141 of mirror 140 includes means for releasably holding mirror 146 within slot 145. For example, frame ring 141 may be made of metal or plastic which is sufficiently elastically deformable to resiliently grip mirror 146 within slot 145, which, in this construction, has an undeformed width slightly less than the thickness of mirror bezel ring 148.

As shown in FIG. 13, modified mirror 140 may include a yoke 149 for holding mirror frame ring 141 and mirror 146 in position on a vanity table or the like. Alternatively, as shown in FIG. 14, further modified mirror 140A may include a stand 150 including a base 151 and stanchion 152 which supports mirror frame 141 and mirror 146. With either arrangement, a user may select a mirror 146 of a desired magnification from a plurality of mirrors 146 having different magnifications, and install or replace the mirror within frame 141.

What is claimed is:

1. A mirror having multiple user selectable magnifications, said mirror comprising;
    a. a first, primary mirror having a first mirrored reflecting surface which provides a first magnification, said primary mirror having through its thickness dimension an aperture,
    b. a secondary mirror having on one side thereof a second mirrored reflecting surface which provides a second magnification, and on an opposite side thereof a third mirrored reflecting surface which provides a third magnification, and
    c. means for pivotably mounting said secondary mirror within said aperture through said primary mirror in a manner permitting said second or third reflecting surfaces to be selectably positioned adjacent said first reflecting surface of said primary mirror.

2. The mirror of claim 1 further including support means for supporting said primary mirror with said first mirrored reflecting surface in an upright position with respect to a horizontal plane.

3. The mirror of claim 2 wherein said support means is further defined as comprising in combination a stand having a base securable against motion, a stanchion which protrudes outwardly from said base, a yoke which protrudes outwardly from said stanchion, and peripheral support means joining said primary mirror to said yoke.

4. The mirror of claim 3 wherein said peripheral support means is further defined as comprising in combination a pair of opposed fastening members joining opposed ends of said yoke to said primary mirror.

5. The mirror of claim 4 wherein said opposed fastening members are further defined as being a pair of laterally opposed pivot pins which allow said primary mirror to be pivoted about an axis collinear with the longitudinal axes of said pivot pins.

6. The mirror of claim 1 wherein primary mirror is further defined as having a circular shape.

7. The mirror of claim 6 wherein said secondary mirror is further defined as having a circular shape.

8. The mirror of claim 6 wherein said secondary mirror is further defined as having an oval shape.

9. The mirror of claim 1 wherein said primary mirror is further defined as having an oval shape.

10. The mirror of claim 9 wherein said secondary mirror is further defined as having a circular shape.

11. The mirror of claim 9 wherein said secondary mirror is further defined as having an oval shape.

12. A mirror having multiple user selectable magnifications, said mirror comprising;
    a. a first, primary mirror structure including a first, front primary mirror plate having a first mirrored reflecting surface which provides a first magnification, and a second, rear primary mirror plate having a second, concave mirrored reflecting surface which provides a second magnification, said primary mirror structure having through its thickness dimension an aperture,
    b. a second, secondary mirror structure including a third, front secondary mirror plate having a third, concave mirrored reflecting surface which provides a third magnification, and a fourth, rear secondary mirror plate having a fourth, concave mirrored reflecting surface which provides a fourth magnification,
    c. first pivot means for pivotably mounting said secondary mirror within said aperture of said primary mirror structure, and
    d. second pivot means for pivotably supporting said primary mirror structure.

13. The mirror of claim 12 wherein said second pivot means for pivotably supporting said primary mirror structure is further defined as comprising in combination a stand, a stanchion which protrudes outward from said stand, a yoke which protrudes outwardly from said stanchion, and peripheral support means which join said primary mirror structure to said yoke.

14. The mirror of claim 13 wherein said peripheral support means is further defined as comprising in combination a pair of laterally opposed pivot members which pivotably join laterally opposed sides of said yoke to laterally opposed sides of said primary mirror structure.

15. The mirror of claim 14 further including third pivotable joint means joining said stanchion to said yoke.

16. The mirror of claim 15 wherein said third pivotable joining means is further defined as having a pivot axis vertically disposed through said stanchion.

17. A mirror having multiple user selectable magnifications, said mirror comprising;
    a. a first, primary mirror structure including a first front primary mirror plate having a first mirrored reflecting surface which provides a first magnification, and a second, rear primary mirror plate having a second, concave mirrored reflecting surface which provides a second magnification, said front and rear primary mirror plates being held in a back-to-back configuration within a primary mirror bezel ring, said front and rear primary plates having through the thickness dimensions thereof an aperture, b. a second, secondary mirror structure including a third, front secondary mirror plate having a third, concave mirrored reflecting surface which provides a third magnification, and a fourth, rear secondary mirror plate having a fourth, concave mirrored reflecting surface which provides a fourth magnification, said front and rear secondary mirror plates being held in a back-to-back configuration, c. first pivot means for pivotably mounting said secondary mirror within said aperture through said primary mirror structure, and d. a support structure for pivotably supporting said primary mirror structure, said support structure comprising in combination a stand having a base securable against motion with respect to a surface of an object, a stanchion which protrudes upwardly from said base, a yoke which protrudes upwardly from said stanchion, and second pivot means joining said yoke to said primary mirror bezel ring.

18. The mirror of claim 17 further including third pivotable joint means joining said stanchion to said yoke.

19. The mirror of claim 17 wherein said primary mirror structure is further defined as having an oval plan-view shape.

20. The mirror of claim 17 wherein said first pivot means is further defined as having a horizontal line of action coaxial with a minor axis of said primary mirror structure.

21. The mirror of claim 17 wherein said aperture and secondary mirror structure are further defined as having a common center located on a major axis of and offset from a minor axis of said primary mirror structure.

22. The mirror of claim 17 wherein said secondary mirror structure is further defined as having circular plan-view shape.

23. A mirror having multiple user selectable magnifications, said mirror comprising;

a. a first, primary mirror structure including a first, front primary mirror plate having a first mirrored reflecting surface which provides a first magnification, said front primary mirror plate being held within a primary mirror bezel ring, b. a secondary mirror structure including a second, front secondary mirror plate having a second, concave mirrored reflecting surface which provides a second magnification, and a third, rear secondary mirror plate having a third, concave mirrored reflecting surface which provides a third magnification, said front and rear secondary mirror plates being held in a back-to-back configuration, c. first pivot means for pivotably mounting said secondary mirror structure to said primary mirror bezel ring in a manner permitting said front and rear secondary mirror plates to alternately face in a same direction as said front primary mirror plate, and d. a support structure for supporting said primary mirror structure.

24. The mirror of claim 23 wherein said first pivot means for pivctably mounting said secondary mirror structure to said primary mirror bezel ring comprises in combination a pin which protrudes outwardly from said secondary mirror structure, and a journal attached to said primary mirror bezel ring which rotatably receives said pin.

25. The mirror of claim 24 wherein said primary mirror structure further includes a fourth, rear primary mirror plate having a fourth, concave-mirrored reflecting surface which provides a fourth magnification, said rear primary mirror plate being held within said primary mirror bezel ring in a back-to-back configuration with said front primary mirror plate.

26. The mirror of claim 25 wherein said journal is further defined as being a radially inwardly perforated portion of said bezel ring located between radially outwardly located peripheral regions of said front and rear primary mirror plates.

* * * * *